US012593747B2

(12) United States Patent
Frick et al.

(10) Patent No.: US 12,593,747 B2
(45) Date of Patent: Apr. 7, 2026

(54) AUTONOMOUS WORKING MACHINE WITH COMPUTER VISION-BASED MONITORING AND SECURITY SYSTEM

(71) Applicant: THE TORO COMPANY, Bloomington, MN (US)

(72) Inventors: Alexander Steven Frick, Farmington, MN (US); Jason Thomas Kraft, Stillwater, MN (US); Peter M. Arendt, Richfield, MN (US); Gregory S. Janey, Excelsior, MN (US)

(73) Assignee: THE TORO COMPANY, Bloomington, MN (US)

( * ) Notice: Subject to any disclaimer, the term of this patent is extended or adjusted under 35 U.S.C. 154(b) by 939 days.

(21) Appl. No.: 17/437,257

(22) PCT Filed: Mar. 11, 2020

(86) PCT No.: PCT/US2020/022051
§ 371 (c)(1),
(2) Date: Sep. 8, 2021

(87) PCT Pub. No.: WO2020/197768
PCT Pub. Date: Oct. 1, 2020

(65) Prior Publication Data
US 2022/0167552 A1     Jun. 2, 2022

Related U.S. Application Data

(60) Provisional application No. 62/937,886, filed on Nov. 20, 2019, provisional application No. 62/823,188, filed on Mar. 25, 2019.

(51) Int. Cl.
*A01D 34/00*      (2006.01)
*A01D 101/00*     (2006.01)
(Continued)

(52) U.S. Cl.
CPC ......... *A01D 34/008* (2013.01); *G05D 1/0212* (2013.01); *G05D 1/0246* (2013.01);
(Continued)

(58) Field of Classification Search
CPC ............ A01D 34/008; A01D 2101/00; G05D 1/0212; G05D 1/0246; G05D 1/0094; G06V 40/172; H04W 4/40; H05B 47/19
See application file for complete search history.

(56) References Cited

U.S. PATENT DOCUMENTS 9,672,635 B2    6/2017  Einecke
9,720,417 B2    8/2017  Reigo et al.
(Continued)

FOREIGN PATENT DOCUMENTS

EP      3291135 A1    3/2018
EP      3032940 B1    5/2018
(Continued)

OTHER PUBLICATIONS

Frick et al., U.S. Appl. No. 62/823,188, filed Mar. 25, 2019.
(Continued)

*Primary Examiner* — Navid Z. Mehdizadeh
*Assistant Examiner* — Micah Chuen-Him Cheng
(74) *Attorney, Agent, or Firm* — Mueting Raasch Group

(57)     ABSTRACT

A supplemental monitoring and security function and system for use with an autonomous working machine such as a robotic lawn mower. The system may use cameras associated with the machine to capture image data and transmit the data to a remote computer. The system may be utilized as a theft deterrent for the mower itself, as well as provide a mobile sentry mode for surveilling and observing a property.

20 Claims, 8 Drawing Sheets

(51) Int. Cl.

| | |
|---|---|
| *G05D 1/00* | (2024.01) |
| *G06V 40/16* | (2022.01) |
| *H04W 4/40* | (2018.01) |
| *H05B 47/19* | (2020.01) |

(52) U.S. Cl.
CPC ............ *G06V 40/172* (2022.01); *H04W 4/40* (2018.02); *H05B 47/19* (2020.01); *A01D 2101/00* (2013.01)

(56) References Cited

U.S. PATENT DOCUMENTS

| | | | |
|---|---|---|---|
| 9,804,604 | B2 | 10/2017 | Mattsson et al. |
| 2013/0056032 | A1 | 3/2013 | Choe et al. |
| 2016/0042621 | A1* | 2/2016 | Hogg ..................... H04N 23/64 |
| | | | 348/155 |
| 2016/0096476 | A1* | 4/2016 | Fairchild ................ B60R 11/04 |
| | | | 348/148 |
| 2016/0157422 | A1 | 6/2016 | Kohler et al. |
| 2018/0213731 | A1 | 8/2018 | Wykman et al. |
| 2019/0066488 | A1 | 2/2019 | Locke et al. |
| 2019/0315314 | A1* | 10/2019 | Haneda ................ G05D 1/0088 |
| 2020/0201328 | A1 | 6/2020 | Abramson |

FOREIGN PATENT DOCUMENTS

| | | |
|---|---|---|
| WO | 2014/003644 A2 | 1/2014 |
| WO | 2014/027945 A1 | 2/2014 |
| WO | 2015/022672 A2 | 2/2015 |
| WO | 2015/022672 A3 | 2/2015 |
| WO | 2016/097897 A1 | 6/2016 |
| WO | 2016/098023 A2 | 6/2016 |
| WO | 2016/098050 A1 | 6/2016 |
| WO | 2016/103164 A1 | 6/2016 |
| WO | 2018/123632 A1 | 7/2018 |
| WO | 2020/033504 A2 | 2/2020 |
| WO | 2020/197768 A1 | 10/2020 |

OTHER PUBLICATIONS

Frick et al., U.S. Appl. No. 62/937,886, filed Nov. 20, 2019.
Stentz, "Robotic Technologies for Outdoor Industrial Vehicles" In Proceedings of SPIE AeroSense, National Robotics Engineering Consortium Robotics Institute, Carnegie Mellon University, Pittsburgh, PA. 2001; 8 pages.
International Search Report and Written Opinion for PCT/US2020/022051, mailed May 26, 2020; 15 pages.
International Preliminary Report on Patentability for PCT/US2020/022051, mailed May 14, 2021; 21 pages.
Written Opinion of the International Preliminary Examining Authority for PCT/US2020/022051, mailed Feb. 17, 2021; 8 pages.
Jain, "Micro Learnings: Image Recognition Vs. Object Detection—The Difference" [retrieved from the Internet on Sep. 16, 2022] https://hackernoon.com/micro-learnings-image-classification-vs-object-detection-the-difference-77110b592343, Feb. 14, 2018; 6 pgs.
Fletcher, "Classification vs Detection vs Segmentation Models: The Differences Between Them and When to Use Each" [retrieved from the Internet on Sep. 16, 2022 via The Wayback Machine] https://web.archive.org/web/20190903165838/https://www.clarifai.com/blog/classification-vs-detection-vs-segmentation-models-the-differences-between-them-and-how-each-impact-your-results, Feb. 13, 2019; 4 pgs.
Rey, "Object Detection with Deep Learning: The Definitive Guide" Blog Post [retrieved from the Internet on Sep. 14, 2022] https://tryolabs.com/blog/2017/08/30/object-detection-an-overview-in-the-age-of-deep-learning, Aug. 30, 2017; 13 pgs.
Mathworks, "Object Recognition - MATLAB & Simulink" [retrieved from the Internet on Sep. 14, 2022 via The Wayback Machine] http://web.archive.org/web/20191130111126/https://www.mathworks.com/solutions/image-video-processing/object-recognition.html, available at least as early as Nov. 30, 2019; 6 pgs.
Brownlee, "A Gentle Introduction to Object Recognition with Deep Learning" [retrieved from the Internet on Sep. 14, 2022 via The Wayback Machine] http://web.archive.org/web/20190620180652/https://machinelearningmastery.com/object-recognition-with-deep-learning/, May 2, 20192; 15 pgs.
Communication Pursuant to Article 94(3) EPC for European Patent Application No. 20 717 422.8, mailed Oct. 21, 2022; 7 pages.

* cited by examiner

AUTONOMOUS WORKING MACHINE WITH COMPUTER VISION-BASED MONITORING AND SECURITY SYSTEM

This application is a 35 U.S.C. § 371 U.S. National Stage of International Application No. PCT/US2020/022051, filed Mar. 11, 2020, which claims priority to and/or the benefit of U.S. Provisional Patent Application Nos: 62/937,886, filed Nov. 20, 2019; and 62/823,188, filed Mar. 25, 2019, wherein each of these documents is incorporated herein by reference in its entirety.

Embodiments of the present disclosure relate to autonomous working machines such as robotic lawn mowers and, more particularly to such machines having a supplemental computer vision-based monitoring and security function and system.

BACKGROUND

Grounds maintenance machines, such as lawn and garden machines, are known for performing a variety of tasks. For instance, powered lawn mowers are used by both homeowners and professionals alike to maintain grass areas within a property or yard.

In recent years, robotic lawn mowers adapted to autonomously mow have become more prevalent. These mowers typically operate unattended within a predefined boundary of a property, relying upon various navigation systems and boundary detection capabilities to ensure the mower is constrained to those areas within the predefined boundary.

SUMMARY

Embodiments described herein may provide an autonomous working machine incorporating a computer vision-based monitoring and security system that allows the machine to perform a supplemental monitoring task. In some embodiments, such systems may use available vision sensors that are otherwise utilized for machine navigation. That is to say, the monitoring and security system may use the same vision sensors that are also utilized to autonomously guide the machine about a work region of a property during operation.

A system and method of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. A first aspect incudes a method of performing a supplemental monitoring task utilizing a robotic working machine. The method includes generating location instructions, wherein the location instructions include one or both of a waypoint and a travel route within the work region. The method further includes receiving the location instructions with an electronic controller associated with the working machine; autonomously moving the working machine, under control of the controller, to an initial observation position either defined by the waypoint or located along the travel route; and stopping the working machine at the initial observation position. The method may also include capturing image data with an image sensor attached to the working machine; and analyzing the image data. Other embodiments of this aspect include corresponding computer systems, apparatus, and computer programs recorded on one or more computer storage devices configured to perform the actions of the methods.

In a second aspect according to the previous aspect, analyzing the image data may include detecting an unknown object in or near the work region. In a third aspect according to any one of the previous aspects, analyzing the image data includes analyzing the image data with the controller. In a fourth aspect according to any one of the previous aspects, analyzing the image data includes analyzing the image data with a remote computer. In a fifth aspect according to any one of the previous aspects, generating the location instructions includes generating user-specified location instructions using a remote computer. In a sixth aspect, the method includes triggering an action based upon analysis of the image data. In a seventh aspect according to the sixth aspect, triggering the action may include transmitting the image data from the working machine to a remote computer. In a ninth aspect according to the sixth aspect, triggering the action comprises activating lighting associated with the property. In a tenth aspect according to any one of the preceding aspects, the method further includes autonomously moving the working machine to a second observation position different than the initial observation position. In an eleventh aspect according to any one of the preceding aspects, the initial observation position further defines a pose of the working machine. In a twelfth aspect according to any one of the previous aspects, generating the location instructions includes generating the location instructions based upon a site image provided by a remote image sensor. In a thirteenth aspect according to the twelfth aspect, the remote image sensor includes a fixed-location camera. In a fourteenth aspect according to the twelfth aspect, the method further includes wirelessly transmitting information regarding the site image between the remote image sensor and the working machine. In a fifteenth aspect according to the twelfth aspect, the method further includes wirelessly transmitting information regarding the site image between the remote image sensor and a remote computer. In a sixteenth aspect according to the twelfth aspect, the method further includes: comparing a first site image to a second site image, wherein each site image is captured by the remote image sensor, and wherein each of the site images are captured at different times; detecting a feature inconsistency between the first and second site images; correlating the detected feature inconsistency to a physical location within the work region; instructing, with the controller, the working machine to move to a position within the work region that is suitable for observing the physical location using the image sensor attached to the working machine; and capturing a comparison image of the physical location with the image sensor attached to the working machine. In a seventeenth aspect according to the sixteenth aspect, the method includes transmitting the comparison image of the physical location to a remote computer. In an eighteenth aspect according to the sixteenth aspect, the method includes confirming the presence of absence of a physical object corresponding to the feature inconsistency using the comparison image.

A nineteenth aspect includes a system for performing a supplemental monitoring function utilizing a working machine configured to autonomously perform a grounds maintenance task. The system includes: an autonomous working machine comprising a tool adapted to perform a grounds maintenance task, wherein the working machine comprises one or more image sensors; a remote image sensor adapted to capture image data of at least a portion of a work region of a property; a wireless communication network operatively connecting the working machine to the remote image sensor; and a remote computer adapted to wirelessly communicate with both the working machine and the remote image sensor. In a twentieth aspect according to the nineteenth aspect, the autonomous working machine comprises a robotic lawn mower.

A more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
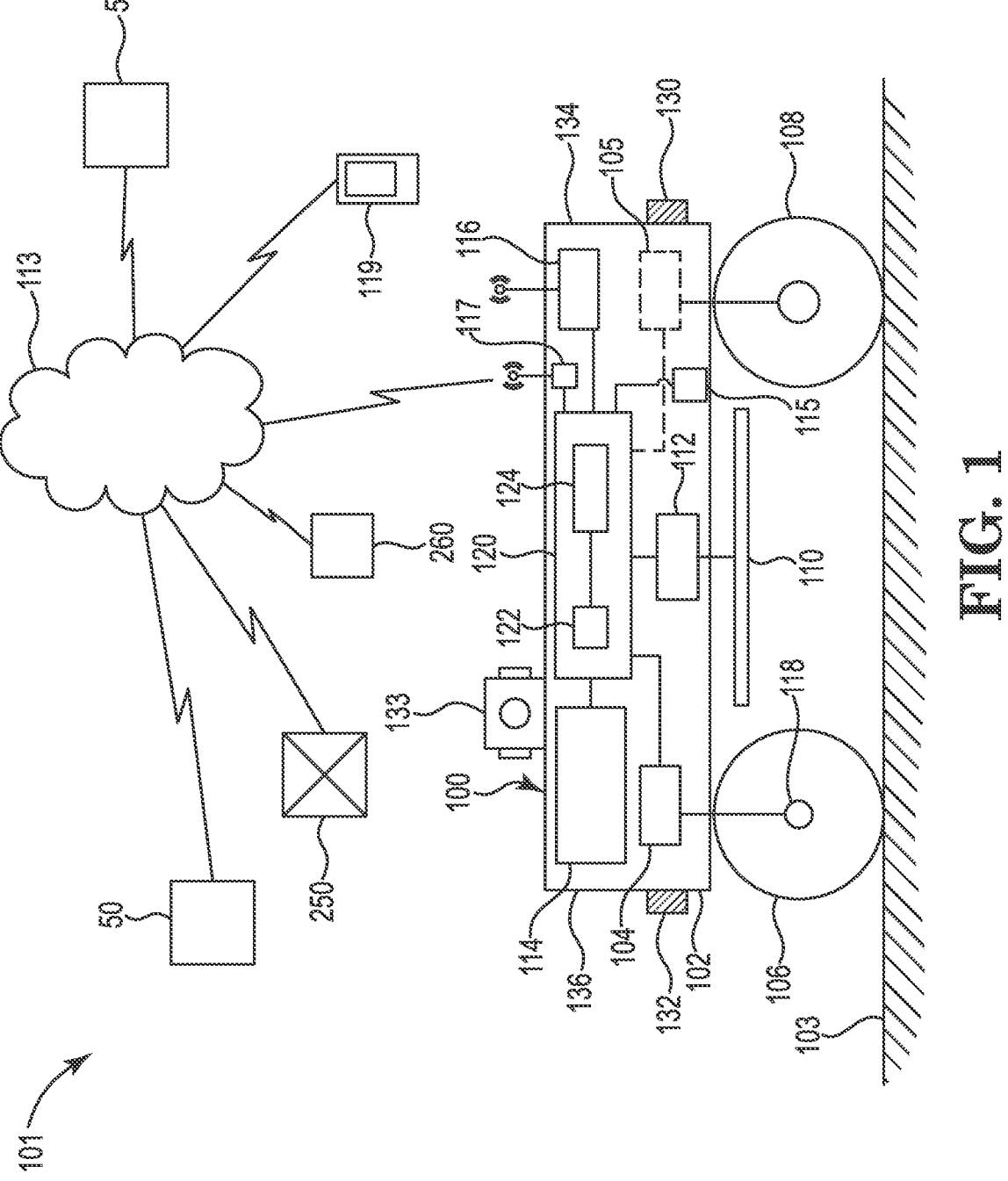
FIG. 1 is a diagrammatic side elevation view of an autonomous working machine (e.g., ground working machine such as a robotic lawn mower) incorporating a vision system and monitoring and security system in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. "I.e." is used as an abbreviation for the Latin phrase id est and means "that is." "E.g.," is used as an abbreviation for the Latin phrase exempli gratia and means "for example."

Embodiments of the present disclosure provide autonomous machines, methods, and systems that permit autonomous functioning of the machine within a work region. An exemplary machine is described and illustrated herein as an autonomous lawn mower. The terms "mower" and "machine" may be used interchangeably herein without limitation.

In some embodiments, the autonomous mower may learn and subsequently recognize a boundary of the work region using an onboard machine vision system and, optionally, other non-vision-based sensors. The vision system may utilize one or more cameras that together form part of a navigation system as described more fully in U.S. Provisional Patent Application No. 62/818,893 entitled Autonomous Machine Navigation Using Vision System, filed Mar. 15, 2019.

Mowers in accordance with embodiments of the present disclosure may further incorporate a monitoring and security system (also referred to herein merely as "security system") to provide the machine with supplemental or additional functionality. For example, the security system may provide or assist with physical security of the mower and/or monitoring or investigating potential objects present in or near an associated property, by including, without limitation, features described in more detail below.

While described as an autonomous mower, such a configuration is illustrative only as systems and methods described herein also have application to other machines including, for example, commercial mowing products, other working machines or vehicles (e.g., debris blowers/vacuums, aerators, dethatchers, material spreaders, snow throwers, weeding machines for weed treatment/remediation, mobile watering/treating vehicles, etc.), indoor working vehicles such as vacuums and floor scrubbers/cleaners, construction and utility vehicles (e.g., trenchers), observation vehicles, and load transportation (e.g., including transport of people and objects). Furthermore, the autonomous machines described herein may employ various types of navigation, such as random, modified random, or specific path planning, to carry out their intended functionality.

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine (e.g., mower 100) is in an operating configuration (e.g., while the machine 100 is positioned such that wheels 106 and 108 rest upon a generally horizontal ground surface 103 as shown in FIG. 1). These terms are used only to simplify the description, however, and not to limit the interpretation of any embodiment described. Further, the terms "determine" and "estimate" may be used interchangeably in this disclosure.

Figure 4:
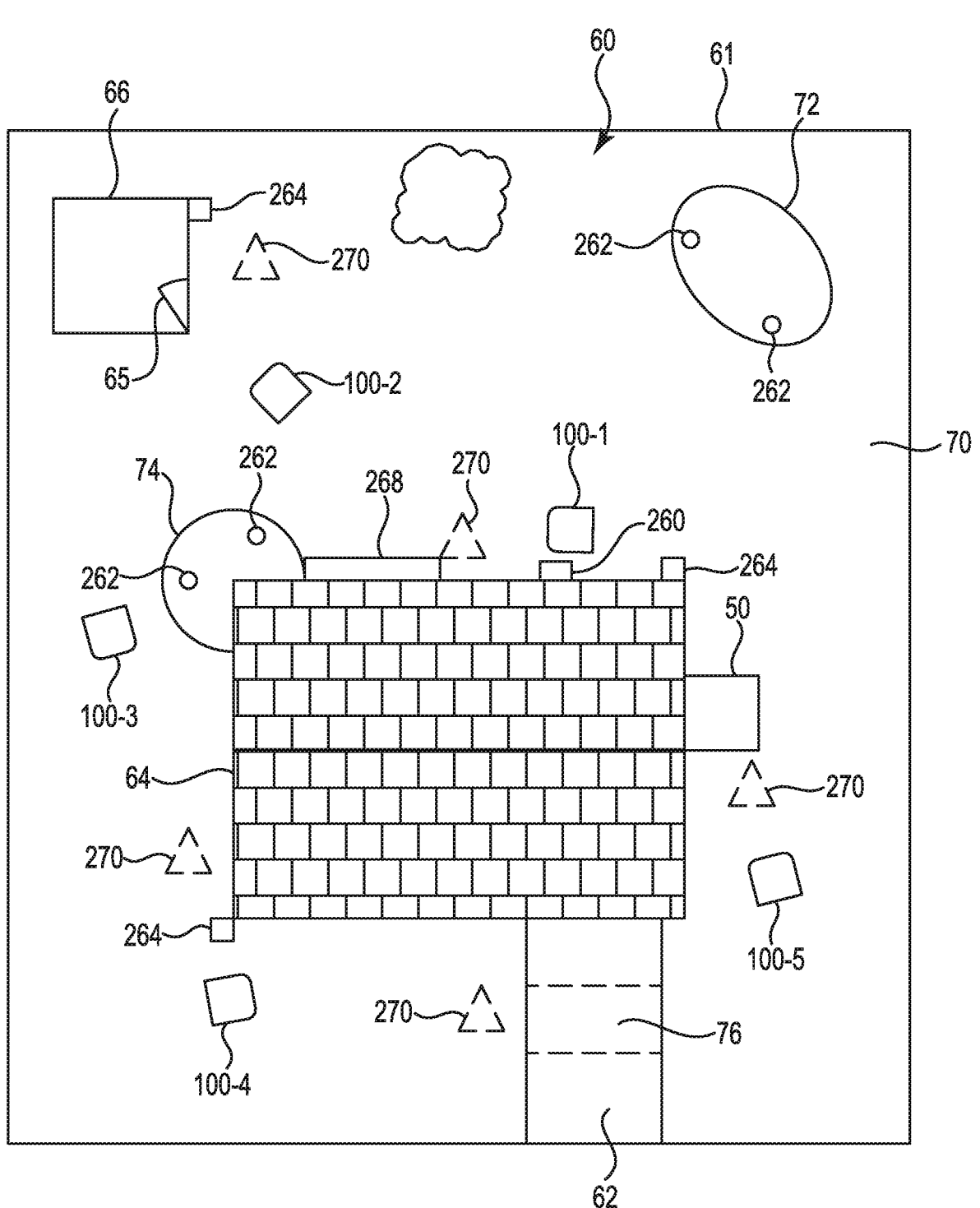
FIG. 4 is a top plan view of an exemplary property on which the machine of FIG. 1 may operate.

As used herein, "property" is defined as a geographic region (such as a yard) circumscribed by a fixed boundary within which the machine 100 may perform work (e.g., mow grass). For example, FIG. 4 illustrates an exemplary property or yard 60 defined by a boundary 61. "Work region" (see, e.g., work region 70 in FIG. 4) is used herein to refer to those areas contained (or mostly contained) within the boundary 61 within which the vehicle will perform work. For example, work regions could be defined by grass surfaces of the property or yard 60 upon which the autonomous lawn mower will perform its maintenance functions (e.g., cut grass). A property may contain one or more work regions including, for example, a front-yard area and a back-yard area, or two yard areas separated by a sidewalk or driveway 62. "Exclusion zone" is defined herein as an area contained within the property/work region in which the machine is not intended to perform its normal maintenance task (e.g., not intended to mow grass). Examples of exclusion zones include landscaped or garden areas such as areas 72 and 74 shown in FIG. 4, pools, buildings, driveways (see, e.g., driveway 62), and other yard features. "Transit zones" may be used herein to refer to paths through exclusion zones that the machine may take when travelling between different work regions of the property (see, e.g., transit zone 76). Typically, the machine will not perform a maintenance task (mowing) when moving through a transit zone. However, as described below, it may provide a supplemental monitoring or security task while positioned in or moving through a transit zone.

While the construction of the actual working machine is not necessarily central to an understanding of embodiments of this disclosure, FIG. 1 schematically illustrates an exemplary autonomous working machine configured as an autonomous lawn mower 100 (also referred to herein as "robot"), which forms part of a lawn mowing system that may include other components such as a charging station 50 and optional remote image sensor 250. As shown in FIG. 1, the mower 100 may include a housing 102 (e.g., frame or chassis with a shroud) that carries and/or encloses various components of the mower as described below. The mower 100 may further include ground support members, such as wheels, rollers, skids, or tracks. In the illustrated embodiment, the ground support members include one or more rear wheels 106 and one or more front wheels 108, that support the housing 102 upon a ground (grass) surface 103. As illustrated, the front wheels 108 are used to support a front-end portion 134 of the housing 102 and the rear wheels 106 are used to support a rear-end portion 136 of the mower housing.

One or both rear wheels 106 may be driven by a propulsion system (e.g., including one or more electric wheel motors 104) to propel the mower 100 over the ground surface 103. In some embodiments, the front wheels 108 may freely caster relative to the housing 102 (e.g., about vertical axes). In such a configuration, mower direction may be controlled via differential rotation of the two rear wheels 106 in a manner similar to a conventional zero-turn-radius (ZTR) riding mower. That is to say, the propulsion system may include a separate wheel motor 104 for each of a left and right rear wheel 106 (see FIG. 2) so that speed and direction of each rear wheel may be independently controlled. In addition, or alternatively, the front wheels 108 could be actively steerable (e.g., including one or more steer motors 105) to assist with control of mower 100 direction, and/or could be driven by the propulsion system (i.e., to provide a front-wheel or all-wheel drive mower).

An implement or tool (e.g., a grass cutting element, such as a blade 110) may be coupled to a cutting motor 112 (e.g., implement motor) carried by the housing 102. When the motors 112 and 104 are energized, the mower 100 may be propelled over the ground surface 103 such that vegetation (e.g., grass) over which the mower passes is cut by the rotating blade 110. While illustrated herein using only a single blade 110 and/or motor 112, mowers incorporating multiple blades, powered by single or multiple motors, are contemplated within the scope of this disclosure. Moreover, while described herein in the context of one or more conventional "blades," other cutting elements including, for example, disks, nylon string or line elements, knives, cutting reels, etc., are certainly possible without departing from the scope of this disclosure. Still further, embodiments combining various cutting elements, e.g., a rotary blade with an edge-mounted string trimmer, are also contemplated.

The mower 100 may further include a power source, which in one embodiment, is a battery 114 having a lithium-based chemistry (e.g., lithium-ion). Other embodiments may utilize batteries of other chemistries, or other power source technologies (e.g., solar power, fuel cell, internal combustion engines) altogether, without departing from the scope of this disclosure. It is further noted that, while shown as using independent blade and wheel motors, such a configuration is illustrative only as embodiments wherein blade and wheel power is provided by a single motor are also contemplated.

The mower 100 may further include one or more sensors to provide location data. For instance, some embodiments may include a global positioning system (GPS) receiver 116 (or other position sensor that may provide similar data) that is adapted to estimate a position of the mower 100 within a work region and provide such information to an electronic controller 120 (described below). In other embodiments, one or more of the wheels 106, 108 may include encoders 118 that provide wheel rotation/speed information (odometry) that may be used to estimate mower position (e.g., based upon an initial start position) within a given work region. The mower 100 may also include a sensor 115 adapted to detect a boundary wire, which could be used alternatively or in addition to computer vision-based navigational techniques.

The mower 100 may optionally include one or more front obstacle detection sensors 130 and one or more rear obstacle detection sensors 132, as well as other sensors, such as side obstacle detection sensors (not shown). The obstacle detection sensors 130, 132 may be used to detect an obstacle in the path of the mower 100 when travelling in a forward or reverse direction, respectively (the mower 100 may be capable of mowing while moving in both forward and reverse directions). As illustrated, the sensors 130, 132 may be located at the front-end portion 134 and rear-end portion 136 of the mower 100, respectively. In addition to the sensors described, other sensors now known or later developed may also be incorporated into the mower 100.

The mower 100 may include one or more computer vision-based sensors to provide localization data, such as position, orientation, or velocity. The computer vision-based sensors may include one or more cameras 133 that capture or record digital image data for use with a vision system. The cameras 133 may be described as part of the vision system of the mower 100. Types of image data include, for example, training image data and/or operational image data. Other image data may include monitoring and security image data as further described below.

The one or more cameras may be capable of detecting visible light, non-visible light, or both. The one or more cameras may establish a total field of view of at least 30 degrees, at least 45 degrees, at least 60 degrees, at least 90 degrees, at least 120 degrees, at least 180 degrees, at least 270 degrees, or even 360 degrees, around the autonomous machine (e.g., mower 100). The field of view may be defined in a horizontal direction, a vertical direction, or both directions. For example, a total horizontal field of view may be 360 degrees, and a total vertical field of view may be 45 degrees. The field of view may capture image data above and below the height of the one or more cameras.

Figure 2:
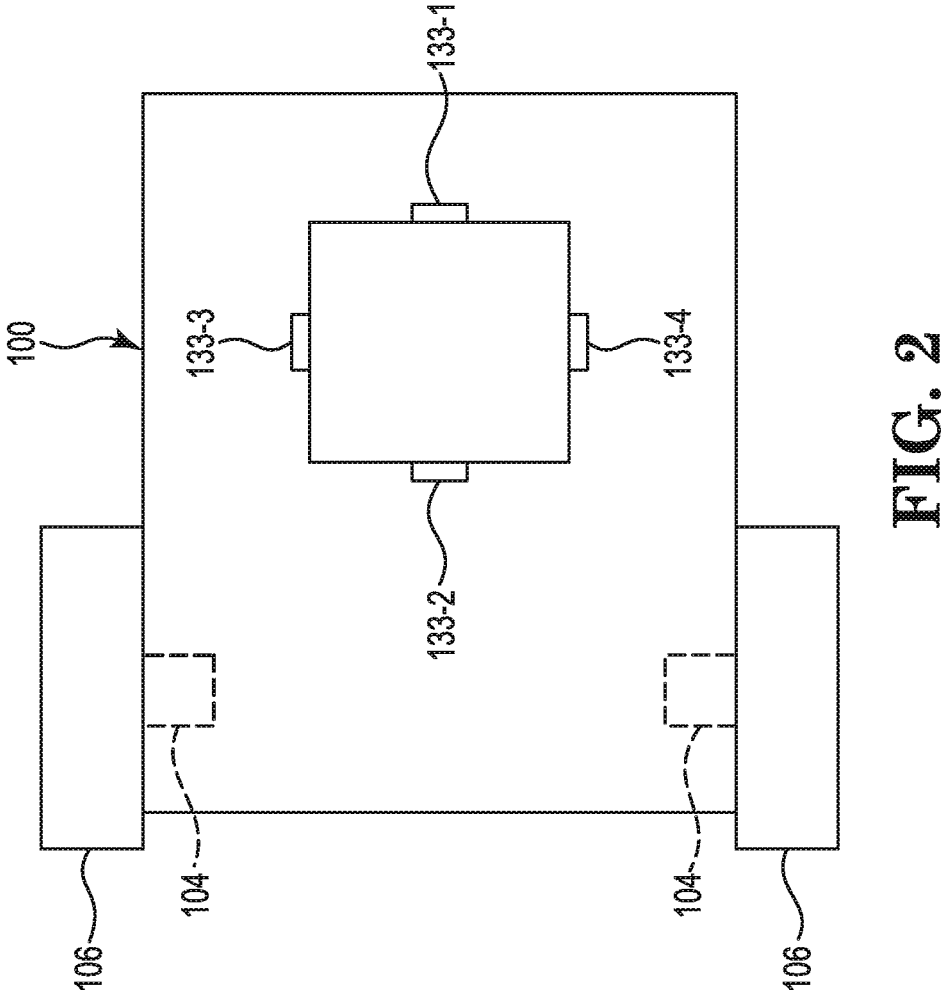
FIG. 2 is a diagrammatic top plan view of the machine of FIG. 1.

In some embodiments, the mower 100 includes four cameras 133 (e.g., cameras 133-1, 133-2, 133-3, and 133-4; collectively and individually referred to as camera or cameras 133) as shown in FIG. 2. One camera 133 may be positioned in each of one or more directions including a forward direction (camera 133-1), a reverse direction (camera 133-2), a first (e.g., left) side direction (camera 133-3), and a second (e.g., right) side direction (e.g., camera 133-4), thereby forming Cardinal directions relative to the mower 100. One or more camera directions may be positioned orthogonal to one or more other cameras 133 or positioned opposite to at least one other camera 133. Although not shown, the cameras 133 may also be offset from any of these directions (e.g., at a 45 degree or another non-right angle).

The mower 100 may also include the controller 120 adapted to monitor and control various mower functions. The controller 120 may include a processor 122 that receives various inputs and executes one or more computer programs or applications stored in memory 124. The memory 124 may include computer-readable instructions or applications that, when executed, e.g., by the processor 122, cause the controller 120 to perform various calculations and/or issue commands. That is to say, the processor 122 and memory 124 may together define a computing apparatus operable to process input data and generate the desired output to one or more components/devices. For example, the processor 122 may receive various input data including positional data from a GPS receiver 116 and/or encoders 118 and generate speed and steering angle commands to the wheel motor(s) 104 to cause the rear wheels 106 to rotate (at the same or different speeds and in the same or different directions). In other words, the controller 120 may control the steering angle and speed of the mower 100, as well as the speed and operation of the cutting blade 110.

Figure 3:
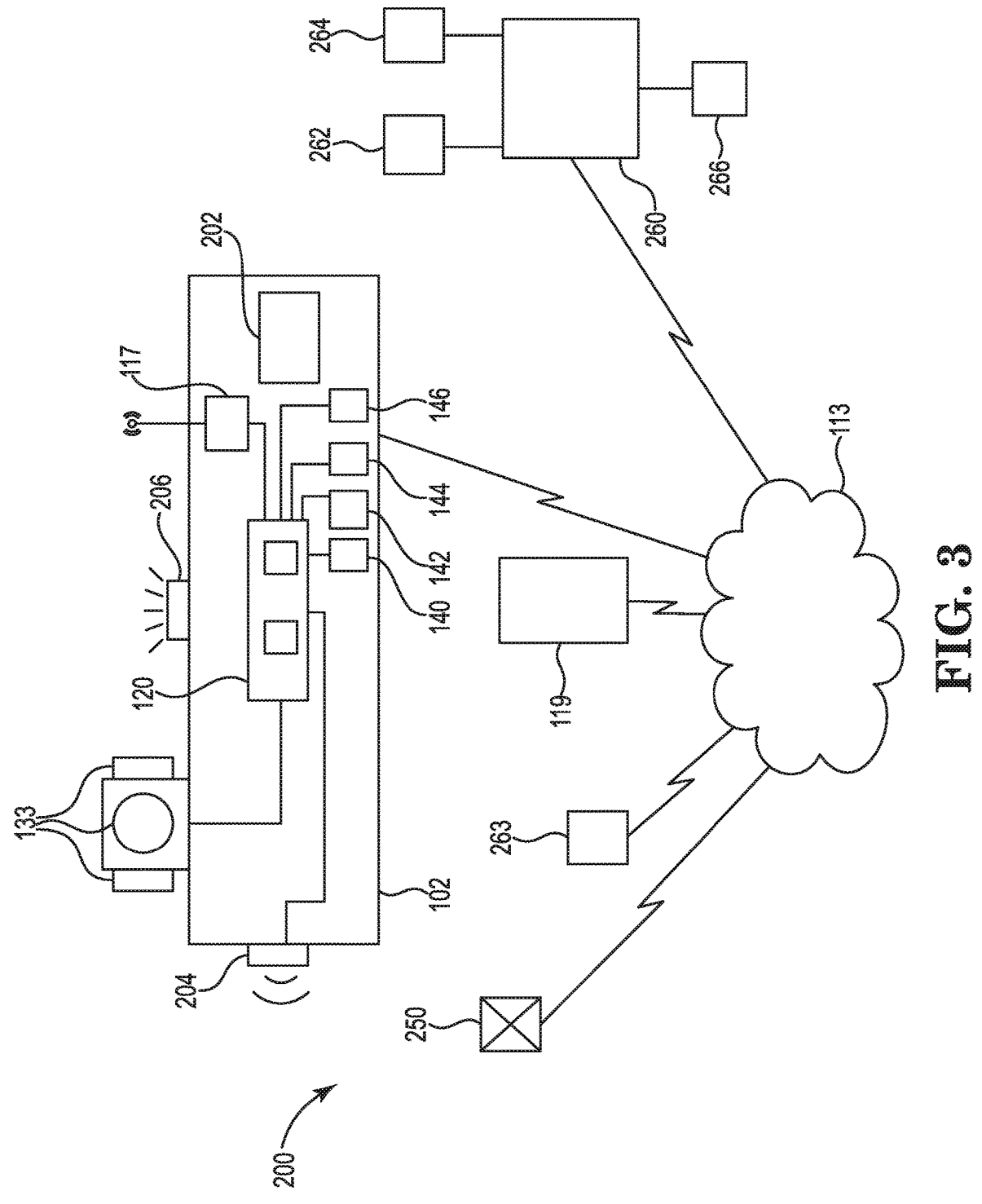
FIG. 3 is an isolated view of portions of the exemplary monitoring and security system of FIG. 1.

Reference herein may be made to various parameters, data, or data structures, which may be handled in the controller 120, for example, by being processed by the processor 122 or stored in or retrieved from the memory 124. The controller 120 may use the processor 122 and memory 124 in different systems. Alternatively, one or more processors 122 and memory 124 may be included in each different system. For example, in some embodiments, the controller 120 may form part of a vision system, which may include a processor 122 and memory 124. The controller 120 may also at least partially define a navigation system, which may also include a processor 122 and memory 124 the same or separate from the processor 122 and memory 124 of the vision system. Moreover, the controller 120 may at least partially define a security system 200 (see FIG. 3), which may also include a processor 122 and memory 124 the same or separate from the processor 122 and memory 124 of the vision system and/or navigation system.

Each system may also be described as having its own controller 120. For example, the vision system may be described as including one controller 120 and the navigation system and security system may be described as having their own separate controllers 120, i.e., the mower 100 may be described as having multiple controllers 120. In general, as used herein, the term "controller" may be used to describe components of a system that receive inputs and provide outputs and commands to control various other components of a system.

In addition, a communication system 101 may be provided to permit the mower 100/controller 120 to operatively communicate (e.g., via a wireless radio 117) with a communication network such as a wireless network 113, thereby allowing communication (e.g., bidirectional communication) between the mower and other devices. For example, the wireless network 113 may be a cellular or other wide area network, a local area network (e.g., Institute of Electrical and Electronics Engineers (IEEE) 802.11 local "Wi-Fi" network), or a personal area or peer-to-peer network ("P2P," e.g., "Bluetooth" network). Other devices may communicate over the wireless network with the mower 100, including, for example, a remote computer 119, which may be configured as a cellular phone, tablet, desktop computer, notebook computer, or wearable computer. Preferably, the wireless network 113 is connected to the internet so that the user/remote computer 119 may interact with the communication system 101 regardless of the user's location. Moreover, connection of the wireless network 113 to the internet allows communication with most any other remote computer including, for example, an internet (cloud)-based server 52.

The communication system 101 may also permit communication over the wireless network with the charging station 50, as well as a remote image sensor 250 as further described below. Although not specifically illustrated, the communication system 101 may include conventional network hardware including gateways, routers, wireless access points, etc. (not shown).

While illustrated as using a centralized communication network (e.g., wherein each device connects to a central network), other embodiments may utilize a decentralized or ad-hoc network, wherein communication occurs directly between devices. Still further, while illustrated as primarily utilizing wireless communication protocols, such a configuration is not limiting as for example, various devices (e.g., the charging station 50 and/or the remote image sensor 250) could connect to the communication network or other devices using wired connections without departing from the scope of this disclosure.

It will be readily apparent that the functionality of the controller 120 may be implemented in any manner known to one skilled in the art. For instance, the memory 124 may include any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 124 and the processor 122 could be contained in separate modules.

The processor 122 may include any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 122 may include multiple components, such as any combination of one or more microprocessors, one or more controllers, one or more DSPs, one or more ASICs, and/or one or more FPGAs, as well as other discrete or integrated logic circuitry. The functions attributed to the controller 120 and/or processor 122 herein may be embodied as software, firmware, hardware, or any combination of these. Certain functionality of the controller 120 may also be performed in the "cloud" (e.g., at the server 52) or other distributed computing systems operably connected to the processor 122.

In FIG. 1, schematic connections are generally shown between the controller 120 and the battery 114, wheel motor(s) 104, blade motor 112, optional boundary wire sensor 115, wireless radio 117, and GPS receiver 116. This interconnection is illustrative only as the various subsystems of the mower 100 could be connected in most any manner, e.g., directly to one another, wirelessly, via a bus architecture (e.g., controller area network (CAN) bus), or any other connection configuration that permits data and/or power to pass between the various components of the mower. Although connections with some of the sensors 130, 132, 133 are not shown, these sensors and other components of the mower 100 may be connected in a similar manner.

In some embodiments, various functionality of the controller or controllers 120 described herein may be offloaded from the mower 100. For example, recorded image data may be transmitted to a remote server (e.g., an internet-based server 52) using the wireless radio 117 and then processed or stored. Alternatively, some functionality of the controllers 120 may be provided by components on the charging station 50 and/or the remote computer 119.

The mower 100 may utilize the exemplary vision and navigation systems to permit autonomous operation of the mower within a given work region(s). For more information regarding exemplary operation and navigation of the mower 100, see U.S. Provisional Patent Application No. 62/818, 893.

Components of the vision and navigation systems (e.g., the cameras 133) may, in some embodiments, also be utilized by a monitoring or security system (referred to herein as "security system 200"), embodiments of which are now described. In addition to addressing physical security (e.g., theft, vandalism) of the mower 100, aspects of the security system may also be used to monitor and investigate the property at which the mower is located. For example, exemplary security systems may detect the presence of unknown objects in the work region (or potential changes in work region topography (e.g., new depressions or ruts)), provide mobile sentry functions, and perform facial recognition of persons approaching the mower. Other monitoring/ security functions as described below may also be provided.

To provide the above-identified functionality, the security system 200 (e.g., controller 120) may utilize computer vision algorithms and machine learning to recognize objects within digital images captured by the cameras 133. As used herein, "object recognition" may be used to refer to various computer vision capabilities for identifying objects within a digital image. These computer vision capabilities may include algorithms for: image classification; object localization; object segmentation; and object detection.

In image classification, the security system 200 may analyze an image and classify the image into one or more various categories (i.e., determining what is contained within the image). For example, image classification algorithms may classify an image as containing a human body or face, a dog, a tree, a fallen limb, etc. Object localization and segmentation may go a step further by, in addition to classifying the image, locating the detected object at a specific location within the image and delineating the same with a bounding box or, in the case of object segmentation, creating a pixel-by-pixel mask of the object. By iteratively applying classification and localization/segmentation algorithms to an image, object detection may yield a list of object classifications present in the image, as well as a bounding box or mask indicating the location and scale of each object.

As used herein, "unknown objects" refers to those objects within the work region (or within a local area of operation within the work region) detected by the controller 120 via the camera 133 (or by a remote camera as described below), but for which the controller does not expect the mower 100, based upon previous training, to encounter. Examples of unknown objects include but are not limited to humans, animals, other yard vehicles, fallen branches, and debris. Unknown objects may include both moving and stationary objects. The controller 120 may respond differently when encountering different unknown objects. For example, the controller 120 may be able to determine that the unknown object is a person and cause the mower to behave differently than if the unknown object is determined to be something other than a person.

As one can appreciate, due to the ability to operate unattended, autonomous mowers may present potential theft targets. Security systems 200 in accordance with embodiments of the present disclosure may provide a deterrent to such activity. An embodiment of the security system is schematically illustrated in isolation from other components of the mower 100 in FIG. 3. As shown in this view and described above, the security system 200 may include the controller 120 and cameras 133 (which again may be the same or different as the controller and cameras of the navigation and vision systems). As stated above, while shown as being carried onboard the mower 100, some or all controller functionality may be provided by other computing devices including for example, the remote computer 119 or internet-connected server (see, e.g., server 52 in FIG. 1).

To deter potential theft, the security system 200 may utilize the cameras 133 to capture image data when the mower recognizes unanticipated motion. For example, the mower may include lift sensors 140, tilt sensors 142, an inertial measurement unit (IMU) 144, and/or wheel weight sensors 146 capable of detecting when the mower is lifted from the ground surface 103 (see FIG. 1) or is otherwise moving at a rate faster than the rear wheels 106 are rotating. When this occurs, algorithms executed by the controller 120 may command one or more of the cameras 133 to capture image data, after which it is processed and/or a notification is transmitted to the remote computer 119 via the wireless radio 117. The notification may include the captured image data or may direct the remote user to an internet address hosting the image data.

As used herein, "image data" may contain any one or more of still images, video, and audio. While still images may be sufficient to provide the desired functions, video and audio data may be included where processing power and communication bandwidth permits.

The security system 200 could also detect an approaching or otherwise encountered unknown object (e.g., person). In such instances, the security system 200 may capture image data even prior to its detection of mower lifting/moving.

The security system 200 may initiate data capture and transmission on all camera 133 when unanticipated persons/ objects approach and/or mower movement is detected. In other embodiments, however, the system may monitor image data from each camera and capture and transmit data from only a certain camera or cameras. For example, security system algorithms may include human face detection, in which case only image data from those cameras that detected a face will be processed and transmitted to the remote computer 119.

The mower 100 may include indicia 202 (e.g., warning label) or other indicators providing notification that the mower includes theft deterrent features. Alternatively or in addition, the mower 100 may include a speaker and/or sound generator 204 that may be activated by the controller 120 in the event a probable theft event is detected. The sound generator may issue audible voice warnings and/or sound an alarm to dissuade further activity. In yet other embodiments, the mower 100 may alternatively or additionally include an illumination source 206 that may be activated by the controller 120 if a probable theft event is detected. The illumination source 206 may merely illuminate the surrounding area, or could flash repeatedly to attract attention. In yet other embodiments, the controller 120 may communicate with a property automation controller 260 to, for example, activate landscape lighting 262, building security lighting 264, or a remote audible alarm (e.g., dwelling-based siren 266) in response to a potential theft event.

One or more of the cameras (e.g., the rear and/or side cameras, or all cameras) may remain active even when the mower 100 is docked in the charging station (e.g., charging station 50, shown in FIG. 4, for re-charging of the mower's onboard battery). As a result, image capture may occur even during re-charging periods.

The security system 200 may utilize algorithms to analyze facial features of persons detected by the cameras 133. If facial features are recognized by the controller 120 (e.g., based upon a previous face-training procedure) as an authorized user, the security system may disable some or all of its various notifications. For example, if a mower 100 detects a person during operation, the controller 120 may first execute facial recognition algorithms based upon the captured image data. If the person is determined to be an authorized user of the mower, the security system may forgo providing any notifications either locally (e.g., sound generator 204, illumination source 206) or to the remote computer. Facial recognition may also, in some embodiments, be used to authenticate a user, thereby eliminating the need for entry of a password or keycode to access various mower systems. To notify the operator that he or she has been correctly identified, the mower may provide a signal or gesture (e.g., execute a particular maneuver, flash a light using the illumination source 206, play an audible sound using the sound generator 204, etc.).

As described above, the cameras 133 may be used to detect unknown objects within the work region (e.g., during mowing or, as described below, during a sentry mode of operation). For example, a chair, bicycle, fallen branch, animal droppings, etc. present in the work region may be detected by the security system 200 (e.g., as the mower traverses the property). Upon detection, the security system 200 may capture image and/or location data and transmit the same to the remote computer 119. While the mower 100 may proceed to operate around the unknown object, providing a notification to the user allows for object removal and for the mower to continue unimpeded thereafter.

In some embodiments, the mower may use the cameras 133 (and optionally, as described below, a remote image sensor 250) to survey the work region before operation. For example, the mower may first survey the work region to see if unknown objects (e.g., excessive leaves) are present before mowing is initiated. If the security system/controller determines that mower operation would be obstructed (e.g., beyond a certain obstruction threshold) by the presence of such unknown objects, it may provide a notification to the remote computer 119, requesting removal of some or all of the unknown objects prior to initiation of mowing.

In addition to unknown objects, the security system 200 may activate at other times during normal (mowing) mower operation, e.g., when the mower loses traction. For example, the mower 100 may encounter a location during mowing where it no longer has adequate traction (e.g., due to loss or turf, standing water, etc.). In such an instance, the security system 200 may capture image data from that location and/or provide a specific location on a map of the work region and provide the same (e.g., via a notification) to the remote computer 119.

In some embodiments, captured image data of "scenes" wherein the mower 100 encounters poor (and/or good) traction conditions may be submitted to a cloud-based server (e.g., server 52 in FIG. 1). Machine learning (ML) algorithms may then analyze the image data and associate the presence of certain objects or scene conditions (e.g., the presence of holes, sand, mud, ruts, septic covers, branches, etc.) with a statistical likelihood of creating a stuck robot condition (situation where the robot will have difficulty maneuvering, or be unable to maneuver, effectively). These learned situations may then ultimately be deployed to other robotic vehicles. These other vehicles/mowers may then apply these learned concepts to potentially avoid conditions wherein this likelihood of getting stuck is present.

In yet other embodiments, the mower 100 could request, e.g., via a notification to a remote computer 119 such as a mobile phone, that the operator confirm or deny whether the object or scene is indicative of the presence of, for example, a hole in the ground surface 103. These interactions may then be provided to the cloud-based server 52 to further assist the ML algorithms. In some instances, the user interactions may allow the operator to authorize the mower 100 to proceed to work in an area where the mower has historically had traction or other issues. For example, the mower 100 could present the operator with the option to proceed, or avoid, mowing a ditch or culvert.

In still other embodiments, the security system 200 may allow the mower 100 to operate in a mobile sentry mode. In the mobile sentry mode, the mower 100 may travel along a particular route or to waypoints (e.g., user-specified waypoints) and utilize the cameras 133 to detect either or both of motion and unknown objects. For example, the mobile sentry mode may be activated at night, wherein the mower 100 autonomously traverses the yard or parts thereof (e.g., in and around gardens where pests may be present) while monitoring image data from the cameras 133. Such night operation may be enhanced when one or more of the cameras 133 is configured with a low-light, infrared or near-infrared image sensor. In some embodiments, the mobile sentry mode is a dedicated mode of operation (e.g., functional when the mower is not mowing). However, mobile sentry mode may, in other embodiments, be functional (or partially functional) during mower operation without departing from the scope of this disclosure. Furthermore, the controlled travel pattern of the mower in the mobile sentry mode may be defined by a series of user-created waypoints for the mower to visit. That is, a user may select the order in which the mower arrives at the waypoints, or the mower may employ an algorithm to select the order in which the waypoints are followed. Alternatively, the mower may follow the waypoints in a random order.

To illustrate exemplary operation of the mower 100 in the mobile sentry mode, FIG. 4 illustrates a plan view of an exemplary property or yard 60 defined by a boundary 61. The property may include a dwelling (e.g., cabin) 64 and one or more out buildings (e.g., shed) 66. Moreover, a driveway 62 may allow access to the property from an adjacent road (not shown). A work region 70 may be defined within the boundary 61 for which the mower 100 will perform lawn mowing tasks. Exclusion zones, which as described above are defined as areas wherein the mower will not perform mowing functions (e.g., garden areas 72 and 74 and the driveway 62), may also be located within the work region. One or more transit zones 76 may be defined through an exclusion zone (such as across the driveway 62) to allow the mower 100 to move about the property in an efficient manner.

A property owner may wish to surveil the property at various times, including at night or times when the owner is not present (e.g., such as may occur frequently with a vacation property). Such surveillance may be useful to detect the presence of unwanted intruders (e.g., pests, vandals, etc.), to inspect the property for storm damage, or merely for observation. Systems and methods in accordance with embodiments of the present disclosure may permit such a supplemental monitoring task by using the mower 100 to surveil the property when the mower is not otherwise performing its normal mowing function.

For example, using the exemplary property 60 shown in FIG. 4, the property owner may wish to monitor the following locations for potential intruders 270: an area adjacent to a door 268 on the back side of the dwelling 64; an area adjacent a door 65 on the out building 66; and areas adjacent left (in FIG. 4), front, and right sides of the dwelling. A conventional security system might require installation of multiple cameras or motion sensing devices to achieve such desired property coverage. However, due to the mobility of the mower 100, monitoring of these various locations may be achieved without the need for multiple products.

To surveil/observe these locations using the mower 100, the user may specify positions of the mower conducive to providing the desired observational coverage. For example, to observe the area near the door 268, the user may determine the mower should be located as shown by mower 100-1 in FIG. 4. Similarly, to observe the area near the door 65, the user may specify that the mower be located as shown by mower 100-2, while the positions of the mower 100-3, 100-4, and 100-5 are selected to surveil the areas associated with the left, front, and right sides of the dwelling, respectively. As used herein, the numerical suffixes -1, -2, -3, and -4 do not represent separate mowers 100, but rather represent the mower at different times and locations (waypoints) during the monitoring task.

In addition to specifying the general location of the mower, the user may also specify an orientation or "pose" (e.g., specify that the front end of the mower 100-2 is directed toward the door 65). This may be useful in ensuring one of the cameras 133 (e.g., camera 133-1 in FIG. 2) is optimally positioned to capture image data in the area of concern. In other embodiments, specifying the pose may not be required as the field of view provided by the four cameras 133 may be sufficient to capture most or all of a 360-degree view surrounding the mower.

Figure 5:
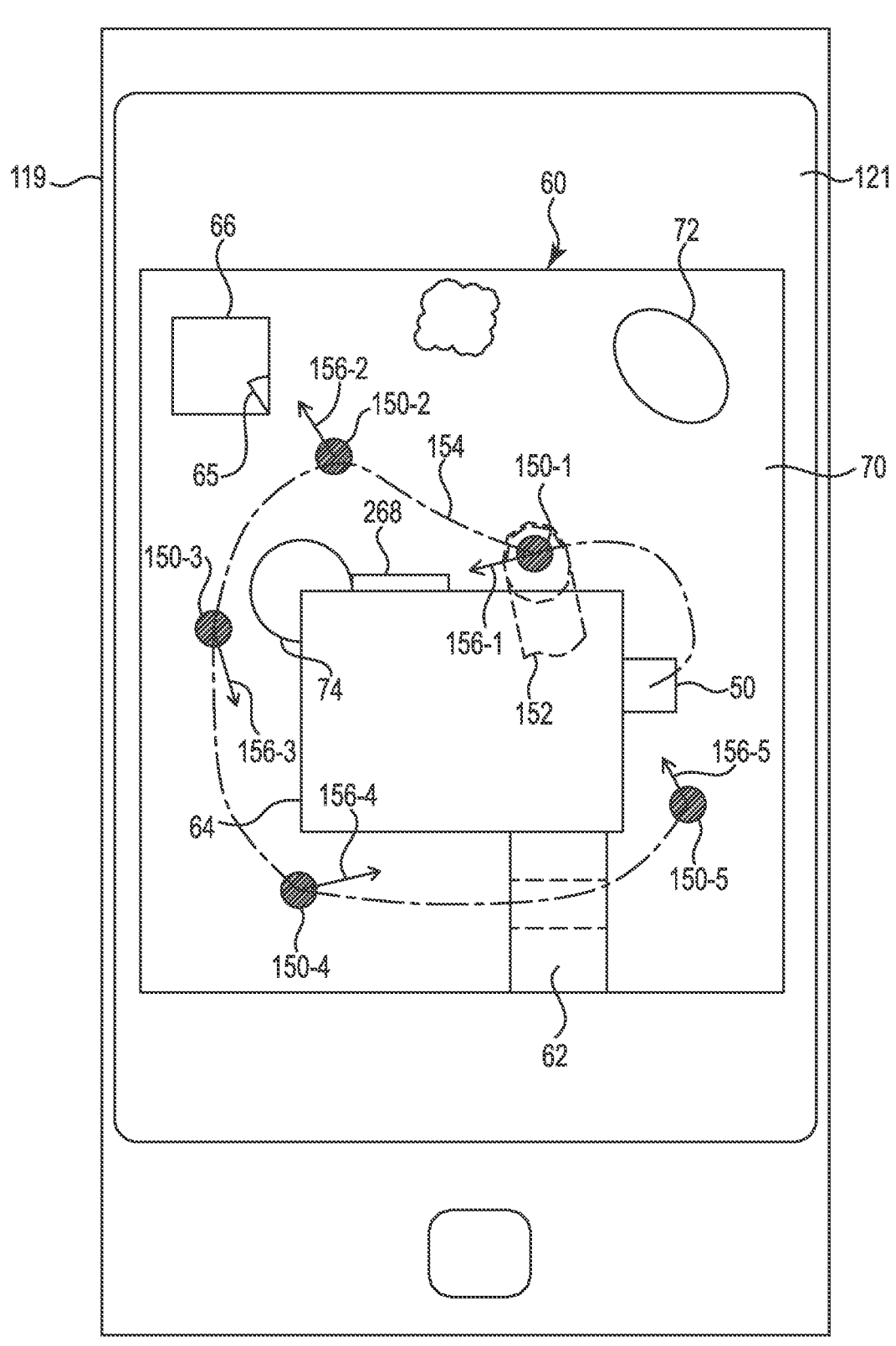
FIG. 5 is a depiction of the property of FIG. 4 on a display of a remote computer in accordance with embodiments of the present disclosure.

In order to permit the user to designate the locations (waypoints) of the mowers 100-1, 100-2, 100-3, and 100-4, application software running on the remote computer 119 may be provided. For example, the application software running on the remote computer 119 (which is illustrated in FIG. 5 as a tablet computer) may present a diagrammatic depiction of the property 60 on its display 121. The representation presented on the remote computer may be generated in various ways. For example, it may automatically generate based upon a previously-executed training process used to provide the mower's navigation system with the boundaries of the work region 70 and all exclusion zones (driveway 62, exclusion zones 72 and 74). In other embodiments, some or all of the depiction presented by the application may be manually created, e.g., by the user.

With the software application running on the remote computer 119, the user may designate desired waypoints 150-1, 150-2, 150-3, 150-4, and 150-5 (corresponding to the locations of the mower 100-1, 100-2, 100-3, 100-4, and 100-5, respectively) by pressing his or her finger 152 at the corresponding locations on the display 121. Alternatively, the user may first draw a route 154 along which the mower will travel, and then tap on the screen to designate the locations 150 along the route. In some embodiments, the user may also designate the mower pose at each of the waypoints by drawing a vector with the finger 152. For example, the user may draw a vector 156-1 from waypoint 150-1 as shown to ensure the mower's front camera faces the area around the door 268. Similar vectors 156-2, 156-3, 156-4, and 156-5 may be drawn from the waypoints 150-2, 150-3, 150-4, and 150-5, respectively to orient the mower as desired at each waypoint.

In some embodiments, the mower 100 may travel between the waypoints along the route 154. Alternatively, the controller 120 may permit the mower to move between the waypoints in most any manner (e.g., the controller may choose the most power-economical route to conserve battery).

The application software may also permit the operator to establish a time when the mower 100 will start monitoring the property (e.g., when the mower will move to the first waypoint). The software may further allow the operator to dictate how long the mower will remain at each waypoint, as well as how many times the mower should repeat the route (e.g., over the course of a single night, what days of the week, etc.). Alternatively, the operator may, using the remote computer 119, remotely instruct the mower to travel the route (or to one or more waypoints on, or not on, the route) in an on-demand fashion. While illustrated in FIG. 5 as having only a single established route 154, embodiments wherein multiple routes, and different waypoints, are identified are also contemplated.

While the mower 100 may capture image data while at the various waypoints, it may also capture image data as it travels between waypoints, potentially increasing its ability to detect unknown objects. Moreover, as stated elsewhere herein, the mower may continue to operate in the monitoring/sentry mode when it is located in the charging station 50. As a result, the charging station may be strategically located near an area of concern if more intensive surveillance is desired.

As with theft deterrence, the mobile sentry mode may utilize the sound generator 204 and illumination source 206 (see FIG. 3) to warn potential intruders. Alternatively, the mobile sentry mode may keep the mower "dark" and instead only provide notifications to the remote computer 119 upon a detected event. In yet other embodiments, the mower 100 may stop propulsion to further monitor a detected event, and/or "follow" detected motion to provide additional data regarding potential intruder (e.g., human, animal) movement.

As stated above, the mobile sentry mode may also operate using remote control. For example, a user, via the remote computer 119 (see FIG. 5), may command the mower to a certain waypoint (e.g., location and heading) within the work region, where it may then remain stationary. For example, it could be commanded to a location near the out building 66, door 268, property (e.g., gate) entrance, or near a garden area 72 that may benefit from pest monitoring or animal observance. When motion is then sensed, the controller 120 could trigger any available actions (e.g., audible or visual warning, activation of landscape lighting 262 (see FIG. 4) or building security lighting 264 (see FIG. 4), issuance of a notification to the remote computer, etc.) in response. As stated elsewhere herein, interaction with other systems (e.g., landscape or building lighting) may result from communication with the property automation controller 260, which may also be connected to the communication network as shown in FIG. 1. In some embodiments, the triggered action could, in addition or alternatively, include activation of one or more zones of an irrigation controller 263 (see FIG. 3) to, for instance, assist with driving away an animal or other intruder.

This remote control aspect of the mobile sentry mode may also be beneficial to other applications. For example, the mower 100 could be commanded by the user to a particular area of the work region and parked. The camera could then provide a live view of the area. Such functionality may be useful to, for example, remotely monitor irrigation zones while the operator is located elsewhere, e.g., near the irrigation controller. Another example may include remotely surveying an unoccupied (e.g., cabin) property for storm damage and/or human/animal intrusion.

In yet another application, mobile sentry mode may be used to monitor the presence of sun/shade or temperature in a particular area in or near the work region and/or during a particular seasonal period. For example, the controller 120 could periodically command the mower to a certain location and orientation/pose (e.g., at the same time daily, weekly, monthly, etc.) and capture image data. Post processing of that data may be used to determine how much sunlight falls on the monitored area within a given period of time (week, month, season, etc.). Such information may be useful when evaluating plants and irrigation schedules. Similarly, such periodic capture from the same location and heading may be useful for creating time-lapse videos, e.g., to illustrate vegetation growth and other changes.

Figure 6:
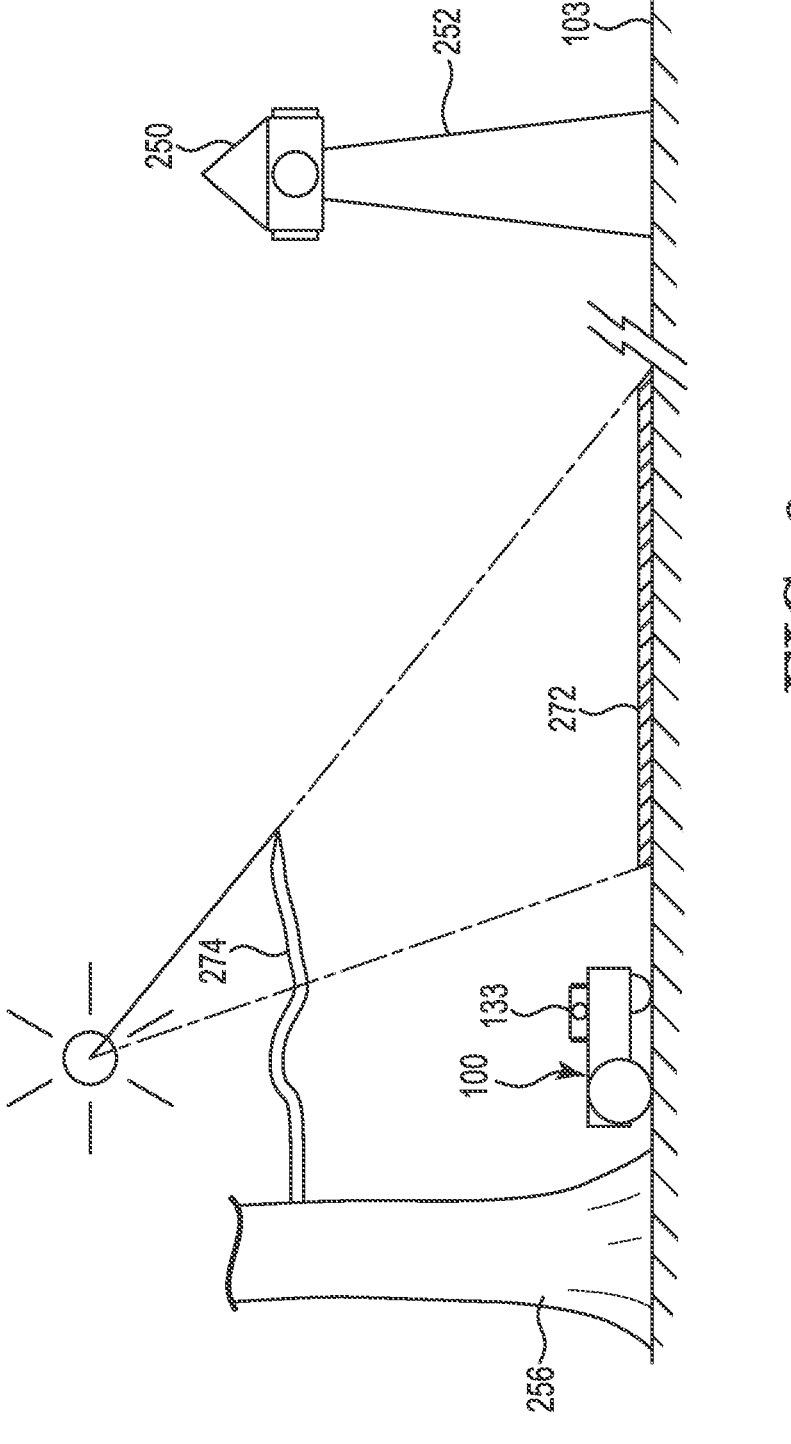
FIG. 6 illustrates an exemplary monitoring and security system incorporating the machine of FIG. 1 and a remote image sensor.
Figure 7:
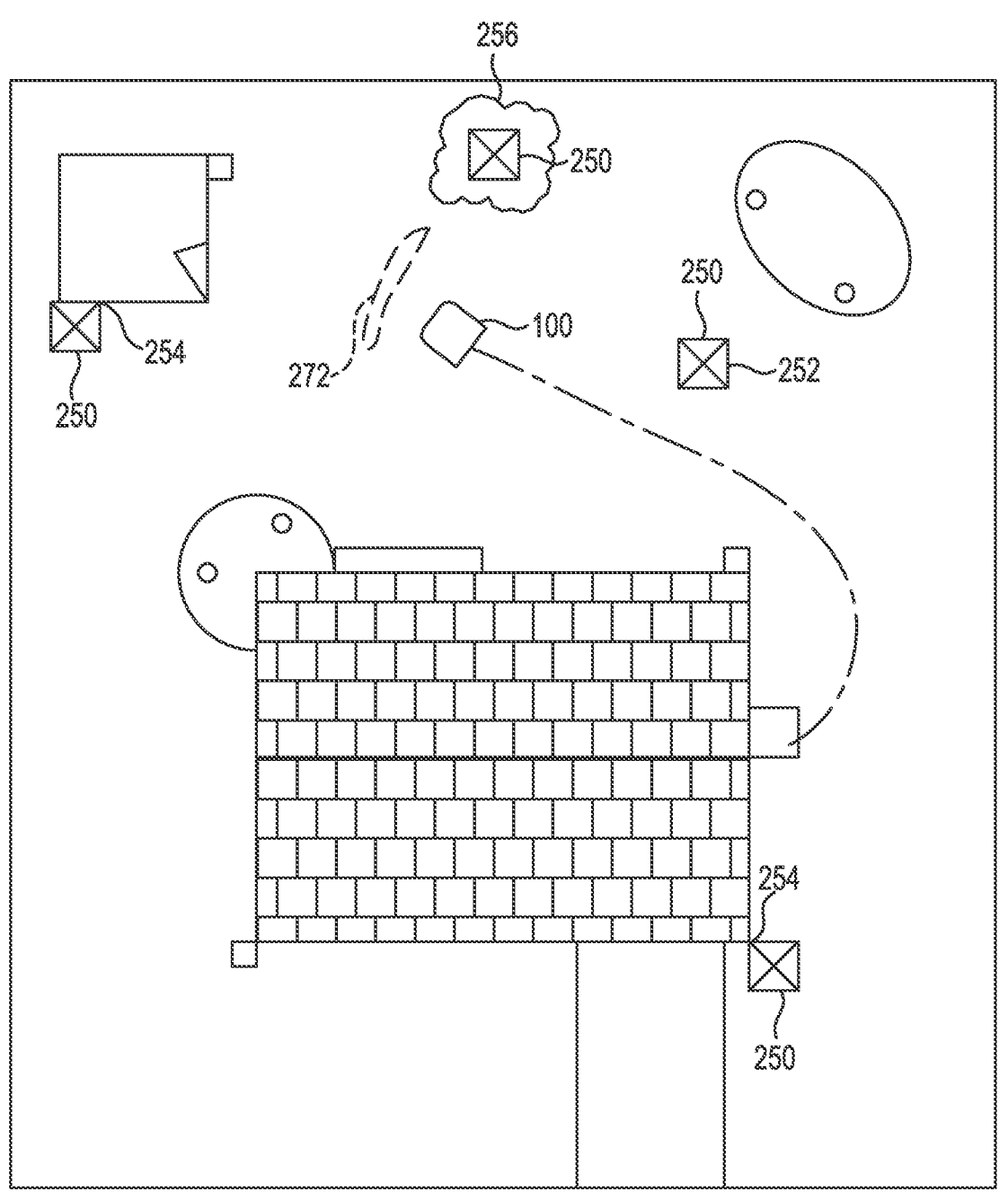
FIG. 7 is a top plan view of a property incorporating one or more remote image sensors like that shown in FIG. 6.

FIGS. 6 and 7 illustrate embodiments of the monitoring and security system 200 that further include the remote image sensor 250. The remote image sensor 250 may be part of a single- or multi-camera system (e.g., one, two, three, or four or more cameras) similar to the cameras 133 described above. Moreover, the remote image sensor 250 may be located in or near the property and is preferably positioned at an elevation that provides a wide field of view of portions of the work area. For instance, the remote image sensor 250 may be a fixed-location camera mounted to a post 252 (see, e.g., FIG. 6), to building structure 254, or to a tree 256 or the like as indicated in FIG. 7. Alternatively, the remote sensor could also be mobile, e.g., aerial drone or ground vehicle-based camera.

As shown in FIG. 6, the remote image sensor 250 may "see" or otherwise provide site images of a large portion of the work area at any given time. As a result, it may be better suited to detecting unknown objects before the mower 100. Moreover, the remote image sensor 250 may be well-suited for surveying a portion or portions of the work region before mowing to determine if debris or other unknown objects may interfere with mower operation.

Still further, as the remote image sensor 250 also communicates with the communication system 101 (see, e.g., FIGS. 1 and 3), the monitoring and security system 200 may combine the benefits of the large field-of-view remote image sensor 250 with the mobile platform of the camera 133 to further improve object detection. For instance, as shown in FIG. 6, the remote image sensor 250 may capture a first site image and a second site image, wherein each site image is captured at different times. The controller may then compare the first and second site images and apply object recognition algorithms to detect a potential feature inconsistency between the first and second images. As used herein, "feature inconsistency" includes an object detected by the remote image sensor 250 (or the camera 133) in a subsequent (e.g., second) image that was not detected in an earlier (e.g., first) image. When such a feature inconsistency is detected, the controller 120 may correlate the detected feature inconsistency to a physical location within the work region.

Once the physical location of the feature inconsistency is determined, the controller may instruct the working machine 100 to move to a position within the work region that is suitable for observing the physical location using the image sensor (e.g., camera 133) attached to the machine 100. The image sensor (camera 133) attached to the machine may then capture a comparison image of the physical location. The comparison image (or data associated therewith) may then be compared to the site images (or associated data) in an effort to determine whether the feature inconsistency is an actual unknown object or something of less concern. That is to say, the comparison image may be used to confirm the presence or absence of a physical object corresponding to the feature inconsistency. The comparison of the images may be conducted by the controller 120, or by the remote computer (e.g., remote computer 119 or server 52).

FIGS. 6-7 illustrate an exemplary application of the security system 200 incorporating the remote image sensor 250. Upon comparing the first and second site images captured with the remote sensor as described above, a potential unknown object 272 may be detected. However, due to sensor limitations (e.g., lighting, resolution, etc.), the remote image sensor 250 may be unable to determine if the object 272 is, for example, a fallen branch or merely a shadow of a tree limb 274.

In this situation, the sensor may communicate information regarding the site image(s) (e.g., the presence and location of the feature inconsistency/object 272) to the working machine/mower 100 (e.g., to the controller 120) and/or the remote computer 119. The controller 120 may then dispatch the mower to a position at or near the object 272 as shown in FIG. 6, at which point it may capture image data of the object 272 from its vantage point with the camera 133. With the image data provided by the cameras 133, the controller 120 may determine that the object is merely a shadow (of the tree limb 274) and not a physical object itself. If the object 272 were determined by the camera 133 to be an actual fallen limb, a notification (with or without image data) may be provided to the remote computer 119.

Figure 8:
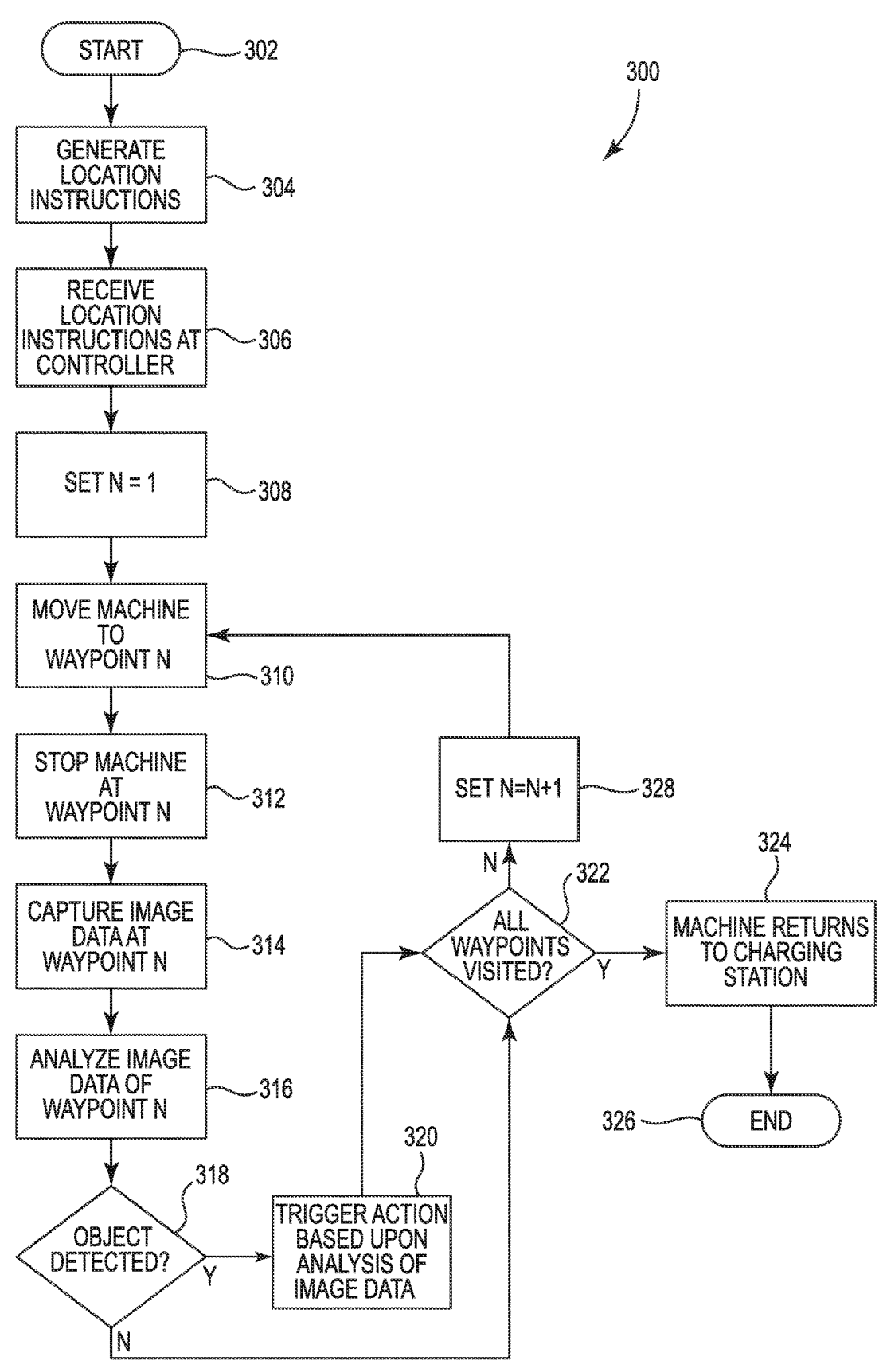
FIG. 8 is a flowchart illustrating an exemplary method of operating the working machine in a supplemental monitoring mode.

FIG. 8 illustrates a method 300 of performing a supplemental monitoring task utilizing a robotic working machine in accordance with embodiments of the present disclosure. As indicated herein, the working machine may be the autonomous mower or other machine adapted to autonomously perform one or more grounds maintenance tasks (such as lawn mowing) within a work region of a property.

The exemplary method 300 may provide a system for performing the supplemental monitoring function utilizing the working machine/mower as described herein (i.e., a working machine configured to normally autonomously perform a grounds maintenance task such as lawn mowing). The system may thus include: an autonomous working machine having a tool adapted to perform a grounds maintenance task, wherein the working machine comprises one or more image sensors 133; a remote image sensor 250 adapted to capture image data of at least a portion of a work region of a property; a wireless network 113 operatively connecting the working machine to the remote image sensor; and a remote computer 119 adapted to wirelessly communicate with both the working machine and the remote image sensor.

As shown in FIG. 8, the process is entered at 302. Location instructions are generated at 304 and transmitted to, or otherwise received by, the controller (e.g., controller 120) at 306. As described above, these instructions may be one or both of a waypoint and a travel route. Moreover, the instructions may be either generated by the user (see, e.g., user-specified location instructions using the remote computer as described in association with FIG. 5) or generated based upon a site image or other image data provided by a remote image sensor such as the remote image sensor 250 described herein.

A counter N may then be set to a value of 1, e.g., by the controller 120 at 308, and the machine moved to an initial observation position at 310 (under control of the controller 120). The initial observation position (see, e.g., location of the mower 100-1 in FIG. 4) may be defined or otherwise correspond to a waypoint "N" or to a location along the travel route. As stated above, this initial observation position (or any other observation position) may include not only a location but a pose or vector of the machine as well. The machine may stop at initial observation position/waypoint as represented by 312 in FIG. 8 and capture image data with the image sensor 133 (which is also referred to herein as "camera" or "cameras") attached to the machine 100 as indicated at 314.

As described above, the image data (which may include one or more images) may be analyzed (again, by the controller 120 or a remote computer) at 316 using object recognition algorithms to detect the presence of an unknown object in or near the work region as indicated at 318. If an unknown object is detected at 318 during the analysis of the image data, the process may then trigger an action (e.g., activate a local or remote alarm, activate a local illumination source and/or lighting associated with the property (e.g., building or landscape lighting), activate the irrigation controller 263, and/or transmit the image data or other notification from the working machine to the remote computer 119) at 320.

The machine may continue to monitor the detected object based upon various factors. For example, the machine may monitor the event for a fixed period of time or remain in place until the unknown object is no longer present. Alternatively, it may remain at waypoint N until a remote operator instructs the machine to continue its monitoring function.

After triggering the action at 320 (or, in the case that no object is detected at 318), the machine (e.g., controller) may next determine if all waypoints have been visited at 322. For instance, if the waypoint N was determined by a single area of concern identified by the remote image sensor 250, the controller may conclude at 322 that the answer is yes, at which point the machine may return to its charging station (e.g., charging station 50) at 324 after which the process ends at 326. However, when the machine is intended to visit multiple waypoints (as may, for example, result from user-specified waypoints instructed in the sentry mode), the controller may determine that additional waypoints remain at 322, at which point the controller may index the counter N by a value of 1 at 328, after which control may return to 310 as indicated in FIG. 8. The machine may then proceed to a second observation point different than the initial observation point (see, e.g., location of mower 100-2 in FIG. 4).

While numerous features/elements are described herein in the context of particular embodiments, various combinations of features/elements from these different embodiments are within the scope of this disclosure. Such combinations may be included in, for example, the embodiments identified below.

A method of deterring theft of an autonomous working machine, the method comprising: detecting motion of the machine; automatically capturing image data from a camera attached to the machine; and automatically transmitting an electronic notification to a remote computer indicating the detected motion and providing access to the image data.

A method of operating an autonomous working machine within a work region comprising: enabling an implement of the working machine; autonomously operating the working machine within the work region; detecting the presence of an unknown object within the work region; capturing image data representative of the unknown object; and transmitting the image data from the working machine to a remote computer.

A method of operating a working machine within a work region comprising: disabling an implement of the working machine; autonomously propelling the working machine within the work region; detecting the presence of an unknown object within the work region; capturing image data representative of the unknown object; and transmitting the image data from the working machine to a remote computer. In some embodiments, this method may further include defining a travel route of the working machine within the work region. In other embodiments, this method may further include: transmitting one or more commands to the working machine from a remote computer, the one or more commands specifying a destination within the work region; and propelling the working machine to the destination before capturing the image data representative of the unknown object.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A method of performing a supplemental monitoring task utilizing a robotic working machine, the robotic working machine adapted to autonomously perform lawn mowing tasks within a work region of a property, wherein the method comprises:

comparing a first site image to a second site image, wherein each of the site images are captured by a remote image sensor, and wherein each of the site images are captured at different times;

detecting a potential unknown object in the work region based on comparing the first and second site images;

communicating, from the remote image sensor to a controller located on the robotic working machine, information regarding the presence and location of the potential unknown object;

dispatching, with the controller, the robotic working machine to an initial position at or near the potential unknown object, wherein the robotic working machine comprises one or more computer vision-based sensors to provide localization data of the robotic working machine as it moves to the initial position;

capturing image data with the one or more computer vision-based sensors attached to the robotic working machine;

comparing the image data to the site images;

determining, with the controller, the presence or absence of a physical object corresponding to the potential unknown object based on the compared image data and site images; and if the potential unknown object is determined not to be a physical object, allowing for the robotic working machine to disregard the detected potential unknown object.

2. The method of claim 1, wherein dispatching the robotic working machine to the initial position at or near the potential unknown object comprises:

generating user-specified location instructions using a remote computer or generating location instructions based upon the site images provided by the remote image sensor; and transmitting the location instructions to the controller.

3. The method of claim 1, further comprising triggering an action based upon determining that the potential unknown object is a physical object.

4. The method of claim 3, wherein triggering the action comprises one or more of: transmitting the image data from the robotic working machine to a remote computer; activating an alarm; and activating lighting associated with the property.

5. The method of claim 1, further comprising autonomously moving the robotic working machine to a second position different than the initial position.

6. The method of claim 1, wherein the initial position further defines a pose of the robotic working machine.

7. The method of claim 1, wherein the remote image sensor comprises a fixed-location camera.

8. The method of claim 1, wherein communicating, from the one or more remote sensors to the controller, information regarding the presence and location of the potential unknown object further comprises:

wirelessly transmitting the information.

9. The method of claim 1, further comprising transmitting the image data to a remote computer.

10. The method of claim 1, wherein determining whether the potential unknown object is a physical object comprises:

executing facial recognition algorithms based upon a person detected in the image data; and forgo providing notifications to a remote computer if the person is determined to be an authorized user of the robotic working machine.

11. The method of claim 1, further comprising:

commanding the robotic working machine, via a remote computer, to a waypoint within the work region; and triggering an action in response to the robotic working machine sensing motion.

12. The method of claim 1, wherein, if the potential unknown object is determined to be a physical object, the method further comprises providing a notification to a user requesting removal of the physical object.

13. The method of claim 1, wherein, if the potential unknown object is determined to be a shadow, the method further comprises allowing for the robotic working machine to disregard the detected potential unknown object.

14. A system for performing a supplemental monitoring function utilizing an autonomous working machine configured to autonomously perform a lawn mowing task, the system comprising:

the autonomous working machine comprising a tool adapted to perform the lawn mowing task;

a remote image sensor configured to capture at least a first site image and a second site image and configured to compare the site images, wherein each of the site images is captured at different times, and wherein the remote image sensor detects a potential unknown object based on comparing the first and second site images;

a controller located on the autonomous working machine, wherein the remote image sensor communicates information regarding a presence and location of the potential unknown object to the controller, and wherein the controller dispatches the autonomous working machine to a position at or near the potential unknown object; and one or more computer vision-based sensors to provide localization data of the autonomous working machine as it moves to the position, wherein the vision-based sensors capture image data, wherein the controller is configured to compare the image data and the site images and determine whether the potential unknown object is a physical object or merely a shadow based on the compared image data and site images.

15. The system of claim 14, wherein dispatching the autonomous working machine to the position at or near the potential unknown object comprises:

generating location instructions based upon the site images provided by the remote image sensor; and transmitting the location instructions to the controller.

16. The system of claim 14, wherein the controller is configured to trigger an action based upon a determination that the potential unknown object is a physical object.

17. The system of claim 16, wherein the action comprises one or more of transmitting the image data from the autonomous working machine to a remote computer, activating an alarm, or activating lighting associated with a property.

18. The system of claim 14, wherein the controller is configured to transmit the image data to a remote computer.

19. The system of claim 14, wherein, in determining whether the potential unknown object is a physical object, the controller is configured to:

execute facial recognition algorithms based upon a person detected in the image data; and forgo providing notifications to a remote computer if the person is determined to be an authorized user of the autonomous working machine.

20. The system of claim 14, wherein the controller is configured to:

commanding the autonomous working machine, via a remote computer, to a waypoint within a work region in which the autonomous working machine is configured to autonomously perform the lawn mowing task; and triggering an action in response to the autonomous working machine sensing motion.

* * * * *